(12) United States Patent
Pollack (10) Patent No.: US 8,360,103 B2
(45) Date of Patent: Jan. 29, 2013

(54) SPLIT VALVE

(75) Inventor: Jack Pollack, Houston, TX (US)

(73) Assignee: Single Buoy Moorings, Inc., Monaco (MC)

( * ) Notice: Subject to any disclaimer, the term of this patent is extended or adjusted under 35 U.S.C. 154(b) by 240 days.

(21) Appl. No.: 12/738,727

(22) PCT Filed: Oct. 15, 2008

(86) PCT No.: PCT/EP2008/063824
§ 371 (c)(1),
(2), (4) Date: Jun. 21, 2010

(87) PCT Pub. No.: WO2009/050173
PCT Pub. Date: Apr. 23, 2009

(65) Prior Publication Data
US 2010/0288374 A1    Nov. 18, 2010

(30) Foreign Application Priority Data
Oct. 19, 2007 (EP) .................................... 07118914

(51) Int. Cl.
*F16K 5/06* (2006.01)
(52) U.S. Cl. .............................. 137/614.01; 137/315.18
(58) Field of Classification Search ............. 137/614.01, 137/614.02, 614, 315.18, 315.01
See application file for complete search history.

(56) References Cited

U.S. PATENT DOCUMENTS

| | | | |
|---|---|---|---|
| 2,333,496 A | 11/1943 | Townhill et al. | |
| 2,357,232 A * | 8/1944 | Townhall et al. | ........ 137/614.01 |
| 2,399,515 A | 4/1946 | Snyder | |
| 2,458,899 A * | 1/1949 | Doubrava | ............... 137/614.01 |
| 3,167,092 A | 1/1965 | Kelly et al. | |
| 4,335,747 A | 6/1982 | Mitsumoto et al. | |
| 5,095,946 A | 3/1992 | McLennan | |
| 5,265,845 A | 11/1993 | Gilliam | |
| 5,305,776 A | 4/1994 | Romano | |
| 6,877,527 B2 | 4/2005 | Dupont et al. | |

FOREIGN PATENT DOCUMENTS

EP    1 245 895 A1    10/2002

OTHER PUBLICATIONS

International Search Report, dated Dec. 4, 2008, from corresponding PCT application.

* cited by examiner

*Primary Examiner* — Kevin Lee
(74) *Attorney, Agent, or Firm* — Young & Thompson (57) ABSTRACT

Valve assembly including a first and second valve components in fluid connection with respective first and second ducts, each valve component having a housing and a closure member, a first closure member having a pivot axis extending transversely to the first duct, the first closure member being pivotable between closed and open positions. The first and second closure members each have a coupling element releasably interconnecting the closure members, so the second closure member can be moved with the first closure member upon pivoting of the first closure member around the pivot axis, the second closure member including connector element for engaging with a complementary connector element on the second housing in a closed position of the second closure member, which connector element maintains the second closure member in a non-pivotable sealed attachment with the second housing when the valve components are separated.

21 Claims, 6 Drawing Sheets

SPLIT VALVE

FIELD OF THE INVENTION

The present invention relates to a valve assembly comprising a first valve component in fluid connection with a first duct, a second valve component in fluid connection with a second duct, each component having a housing and a closure member, the first closure member having a pivot axis, extending transversely to the first duct, the first closure member being pivotable around the pivot axis between a closed position in which the closure member extends transversely to a longitudinal centre line of the first duct and an open position. The invention is particularly suitable for use in hydrocarbon transfer systems as an emergency release valve, for instance for LNG transfer. The invention is particularly applicable in the event of the breakage of a pipe or in any emergency situation requiring two pipe segments to be disconnected.

BACKGROUND OF THE INVENTION

Connection arrangements of this type are well known for interconnecting pipelines for supplying and receiving fluid between two stations, one of which could be a fixed station such as an offshore mooring point and the other of which could be a mobile station, such as a hydrocarbon tanker. Known connection and disconnection arrangements are provided with an emergency disconnection device making it possible, in an extreme situation of drift or accident—for example in case of fire—to distance the mobile pipe section from the fixed pipe section in order to prevent damage to the structure or wrenching off of the pipes, while ensuring containment of the fluid in the pipelines.

In the known arrangements, the pivot axes of the valve disks of the two interconnected pipe sections are spaced apart from one another in the axial direction of the pipe sections. When these disks assume their closed positions they delimit between them a relatively large space that is filled with fluid. In the event of emergency disconnection, this quantity of fluid is lost to the environment. Such an incident may cause pollution of the environment or involve a risk of fire. This is the case in particular for the transfer of liquefied natural gas (LNG) between, for example, a loading or unloading terminal and a liquefied gas tanker.

In the past, many different types of valves have been used in various environments and applications to control the flow of fluids through a pipeline, conduit, or the like. Linear valve types include valves such as globe valves, gate valves and diaphragms, whereas quarter turn valve types include butterfly valves, ball valves and plug valves. These valves can be manually operated or can be actuated and modulating, depending on the specific application. Gate valves, plug valves, wedge valves and ball valves, for example, have all found their respective niches in the art of fluid flow control. It is of primary importance for such valves to provide for substantially leak-free operation; it is especially so for valves regulating the flow of high pressure fluids or potentially hazardous fluids such as highly flammable or caustic substances. Ease of operation, that is, opening and closing, is sometimes as important a feature of a valve, particularly a high pressure valve, as leak-free operation. If a valve cannot be operated quickly and with relatively little effort, besides the wear and tear on the valve parts, the excess time and effort spent in operating the valve and the related inconvenience associated with such a high torque valve can lead to other adverse consequences. Thus it is clearly desirable and advantageous to employ valves that are both reliable, that is, leak proof, and fast and easy to operate, preferably requiring very low torque attainable with only hand or light tool application.

An example of an arrangement for connecting and disconnecting two pipe sections of a fluid transfer system is found in U.S. Pat. No. 6,877,527 where each section includes a butterfly valve with a disk pivotally mounted inside, rotating about a swivel axis between a closed position closing the cross-section of the fluid flow and an open position opening the cross-section of the fluid flow. The swivel axes extend perpendicular to the pipe axis and parallel to each other. This configuration involves for each valve an actuating mechanism and is relatively complex and heavy. Although the known construction reduces the amount of fluid trapped when connection of the pipe sections occurs, it fails to prevent any fluid from staying trapped once the connection is realized.

An example of a cam actuated split ball valve is found in U.S. Pat. No. 5,265,845 where the split ball halves are pivotably mounted to the head member to be pivotable about the mounting means alternately to separate the halves from one another or to collapse them toward one another. The closure member is rotatable with the stem and head member alternately to place the flow port portions in register with the seats to open the valve, or to align the sealing surfaces with the seats to close the valve. An actuating cam is disposed in the valve body between the split ball halves for alternately forcing them apart or permitting them to collapse toward one another and away from sealing engagement with the seats. This arrangement retains its ease of operation and low operating torque at very high working pressures but it does not permit any disconnection of the pipe sections that are attached to the valve.

Another connecting device for conduits is described in U.S. Pat. No. 4,335,747, disclosing in each conduit a spherical valve element having a diametrically extending throughhole. In one pipe section, the mating surface of the housing in which the spherical element is seated is formed with an opening through which a part of the valve element projects. On the other conduit, the spherical valve element does not project beyond the mating surface of the housing but is formed with a part-spherical recess for receiving the projected portion of the valve element in the first ball valve assembly. In this way inclusion of air can be prevented upon interconnecting the two pipe sections, which is especially advantageous in cryogenic applications. Each ball valve however is driven by individual actuating members, making the construction relatively complex and heavy.

An emergency shut-off device is described U.S. Pat. No. 5,305,776, wherein two valves each have an obturator pivotable in the pipe body around parallel pivot axes, so that it can assume a shut-off position transversely to the length direction of the pipe and an open position substantially perpendicular to its shut-off position. Each obturator has an engagement device for engaging the obturator of the other valve fixing the two obturators in a contiguous arrangement in their open positions, which they assume normally, and releasing the obturators so that they can assume their shut-off configurations when the valves move apart because the joint has been subjected to loads equal to or greater than the breaking load. This arrangement has to be changed after each emergency shut-off as the means joining the two obturators have to be broken to separate the obturators.

It is an object of the present invention to overcome the problems discussed above. It is in particular an object of the invention to provide a valve assembly which can be connected and disconnected repeatedly while avoiding leakage. It is in particular an object of the invention to provide a valve assembly which is of a simple and light-weight construction and which is easy to operate.

SUMMARY OF THE INVENTION

Thereto, in a valve assembly according to the invention, the first and second closure members are provided with coupling means for releasably interconnecting the closure members, such that the second closure member can be moved together with the first closure member upon pivoting of the first closure member around the pivot axis, the second closure member comprising connector means for engaging with complementary connector means on the second housing in a closed position of the second closure member, which connector means maintain the second closure member in a non-pivotable sealed attachment with the second housing upon detaching of the coupling means and separating the valve components.

By providing the first closure member, which may be any type of valve such as for instance a butterfly valve, a ball valve, or a cylindrical valve, with a pivot axis, the first closure member can be rotated into an open or closed position. As the second closure member is mechanically linked to the first closure member via the coupling means while the connector means of the second closure member are disengaged from the second housing, the second closure member is pivoted in conjunction with the first closure member between an open and closed position. In case of separation of the pipe sections, both closing members are pivoted in conjunction to assume their closed position whereafter the coupling means are released while the connector means of the second closure member engage with the second housing. As during separation the pivoting function of the second closure member is not required, it is possible to sealingly clamp this member to the second housing in a non-pivoting fluid tight manner.

As a single drive member only needs to be provided on the housing part of the first closure member, the valve according to the invention can be of a simple, easy to operate and light-weight construction. Hence the valve assembly according to the invention is particularly suitable for use on a hydrocarbon transfer arm. Furthermore, mechanical coupling of the first and second closure members in their operational state ensures that a minimum of liquid is included between the first and second closure members, such that on separation of the valve components, spillage of liquid is prevented.

For quick release, the first and second housing may comprise external fixing devices for interconnecting the first and second housing in a fluid-tight manner. The external fixing devices may comprise a number of radial projections on each housing, and a corresponding clamping device hingedly attached to the projection of one housing and clampingly engageable with an opposite radial projection upon hinging.

In one embodiment, the first closure member comprises a body having a through bore, an entry surface and exit surface delimiting the through bore and a coupling surface extending substantially transversely to the entry and exit surfaces, the coupling means being situated on or near the coupling surface, at which coupling surface the closure members are contiguous, the body being connected to a drive shaft extending through the housing to an exterior drive position for pivoting the body around the pivot axis. In this way, a solid valve body, such as a cylindrical or spherical valve body, can be used that is able to withstand high pressures and which is firmly supported within the housing.

A draining channel may extend from the port, through housing part, to the outside, in line with the shaft and can optionally comprise a relieve pressure valve. Via the draining channel, fluids may be transported back into the first duct section via a closed loop, to minimise fluid spillage.

The first and second housings may define a spherical seating, the first and second closure members defining a ball valve, the connector means of the second closure member comprising at least one notch or projection extending transversely to a spherical sealing surface, the connector means on the second housing comprising a complementary projection or notch extending transversely to a spherical sealing surface. The split ball valve provides a low torque open and close function while in a separated state, the spherical section of the second pipe segment can maintain the second pipe segment in a properly closed position.

The spherical segment of the second closure member may be mechanically attached to the second housing via projections on each side of the longitudinal centre line, the closure member on the housing comprising on each side of the longitudinal centre line a groove, the notch being accommodated in the groove upon pivoting the second closure member around the pivot axis into the closed position.

Instead of via rotation around the pivot axis, the spherical segment of the second closure member may be attached to the second housing by pivoting of the pivot axis around the length direction when the second closure member is in its closed state.

In one embodiment, the first and second housing comprise a housing sealing member on a housing surface, the first and second closure members comprising a coupling sealing member on the coupling surface and the second and first housing and/or the closure members comprising a closure sealing member for engaging with a corresponding sealing surface of the first and second closure members and/or the housings. In this way, the housing parts and the closure members form a sealed containment space and fluid transfer to the space between the closure members and the housing is prevented.

In a further embodiment, the combined first and second housing and the first and second closure members are substantially cylindrical, the coupling means on the housing comprising on each side of a longitudinal centre line an annular groove with a midpoint on the pivot axis, the closure members comprising a flange extending transversely to the longitudinal direction into the annular groove. In this way a cylindrical valve of simple construction and easy, low torque operation is obtained.

In again another embodiment, the closure members is substantially plate-shaped, the second housing comprising a internal notch or groove extending in a direction transversely to the fluid flow direction, the second closure member comprising a complementary groove or flange extending transversely to the fluid flow direction into the annular groove for engaging in its closed position with the internal rim.

BRIEF DESCRIPTION OF THE DRAWINGS

A number of embodiments of a valve assembly according to the present invention will by way of non-limiting example be described in detail with reference to the drawings. In the drawings.

DETAILED DESCRIPTION OF THE INVENTION

Figure 1:
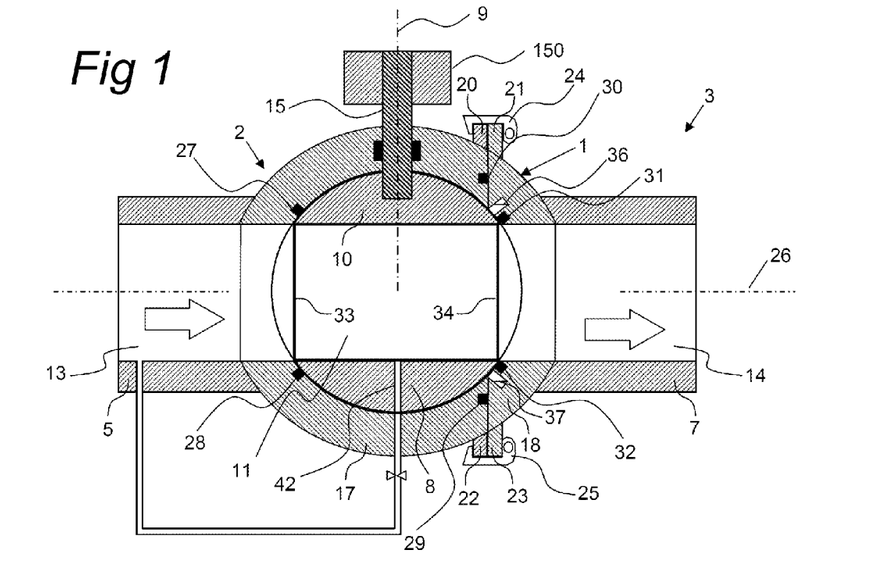
FIG. 1 shows a cross sectional view of a split ball valve according to the invention in an open state.

FIG. 1 shows a valve assembly 1 in the form of a split ball valve with a first valve component 2 and a second valve component 3. The valve assembly 1 has a valve gate 8 with a body 10 which can pivot around pivot axis 9. Each valve component 2, 3 is connected to a respective pipe segment 5, 7. The valve gate 8 is in the form of an oversized ball so that the port 11 in the ball is of the same cross-sectional size as the flow paths 13, 14 of pipe segments 5, 7 which significantly reduces the friction losses. A single drive stem 15, having a grip 14 is attached to the body 10 and extends along the pivot axis 9 through first housing part 17. The grip 14 serves for operation of the valve. This operation can be a manual operation, or an automated operation via a rotary actuator. A second housing part 18 is connected to the first housing part via 17 via an external fixing device having radial projections 20, 21, 22, 23 on each housing part 17, 18. The respective pairs of projections 20, 21 and 22, 23 are clamped together via hinging clamps 24, 25. The sealing surface of the valve gate 8 slides along the spherical surface of the housing parts 17,18, while seals 27,28 and 31,32 prevent fluid from entering between the valve gate 8 and the housing parts 17,18. The seals 29, 30 on the interface between the detachable housing parts 17, 18 prevent leakage of fluids from the valve housing.

In FIG. 1 the split ball valve is open as the port 11 is in line with the fluid flow paths 13, 14, and the fluid is allowed to pass from pipe segment 5, via an entry surface 33 of the gate 8 and an exit surface 34, into the pipe segment 7. The housing part 18 is provided with slots (recesses) 36, 37 for receiving radially projecting connector means 38, 39 provided on a detachable gate part 41 for locking this gate part to the second housing part 18.

The ball valve 8 that is shown in FIG. 1 can also be provided with a leak path 42 having a purge port in housing part 17 to the outside, optionally a relieve pressure valve can be added. A closed loop links the leak path to the inside of the flow path 13 to avoid spillage of the fluid purged.

Figure 2:
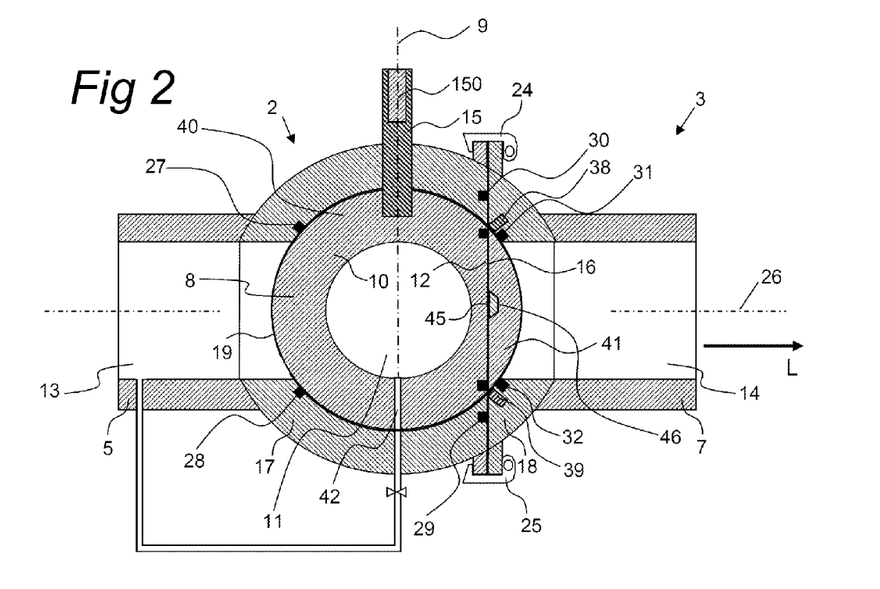
FIG. 2 shows a cross sectional of the valve of FIG. 1 in a closed state.

FIG. 2 shows the valve assembly of FIG. 1 in the closed state. In this configuration, the stem 15 has been rotated by a quarter turn around the axis 9 such that the port 11 now is perpendicular to the direction of fluid flow through the pipe segments 5, 7. The connector means in the form of the projections 38,39 on the gate part 41 that mate with the slots 36, 37 in the second housing part 18. The slots 36, 37 can be shaped as a part of an annular groove with its center on the pivot axis 9, such that the groove can receive the projections 38, 39 while rotating the valve gate parts 40, 41 jointly around the pivot axis 9. The two valve parts 40, 41 are interconnected via coupling means on respective coupling surfaces 12, 16 of the gate parts 40, 41 in the form of a protrusion 45 on gate part 40 and a mating recess 46 in gate part 41. The coupling means ensure a mechanical connection between the valve gate parts 40, 41 such that upon rotation of the gate part 40 around pivot axis 9, the gate part 41 is entrained. The coupling means may alternatively comprise magnetic coupling means, friction material or any other coupling means ensuring rotational coupling whilst allowing separation of the gate parts 40, 41 in the length direction L of the pipe segments 5, 7. The spring loaded seals 27, 28 and 31, 32 between valve gate 8 and the housing parts 17,18 and the static seals 29, 30 on the housing interface ensure a sealing of flow paths 13, 14 of the two valve gate parts 40, 41 once in an interconnected position.

The coupling surfaces 12, 16 of the gate parts 40, 41 can also divide the port 11 into two parts 9 (not shown). In that case the coupling surfaces 12, 16 will not be contiguous on all their surface.

Figure 3:
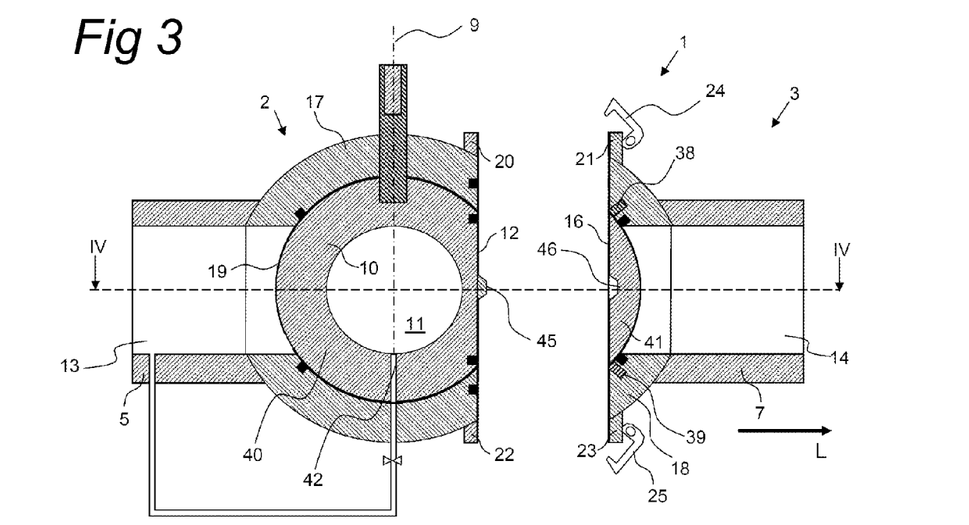
FIG. 3 shows a cross sectional view of the valve of FIG. 1 wherein the valve components are separated.

FIG. 3 shows the valve assembly 1 after the housing parts 17, 18 and the valve gate parts 40, 41 have been separated in the length direction L. The hinging clamps 24, 25 are pivoted to disengage from the radial projections 20, 22 on the housing part 17. The valve gate part 40 is disengaged from the valve gate part 41 as the protrusion 45 is removed from the recess 46. The gate part 41 is locked to the housing part 18 via the projections 38, 39 engaging with the slots 36 37 in the housing part 18. The flow paths 13, 14 in pipe segments 5 and 7 are closed by the respective gate parts 40, 41.

Figure 4:
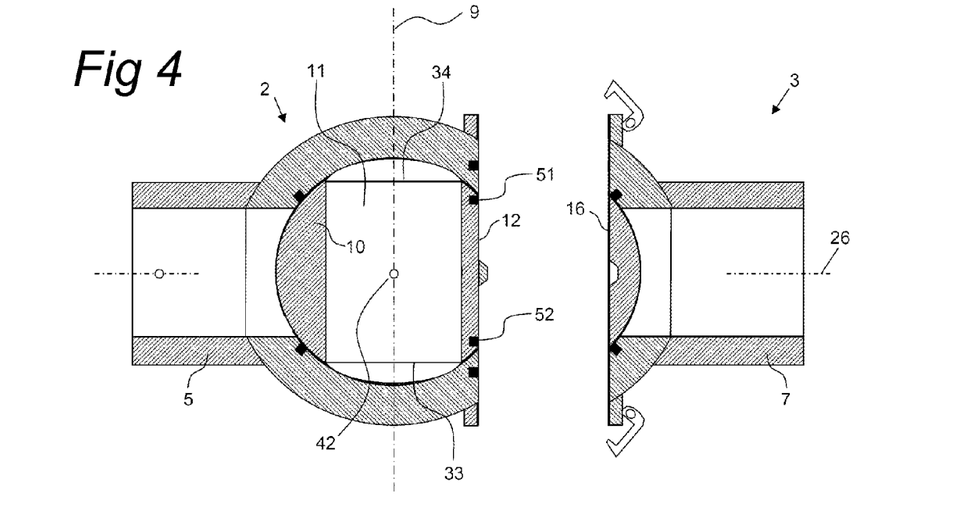
FIG. 4 shows a sectional top view along the line IV-IV of FIG. 3

FIG. 4 shows a sectional view of the valve configuration of FIG. 3 through the line IV-IV. The extremity of the leak path 42 is visible and it appears clearly that it enables the fluid trapped in the gate port 11 to be removed once the gate is closed. The seals 51, 52 on the coupling surface 12 of the gate part 40 prevent any leakage of the fluid once the coupling surface 12 is contiguous with the coupling surface 16 of the gate part 41.

Figure 5A:
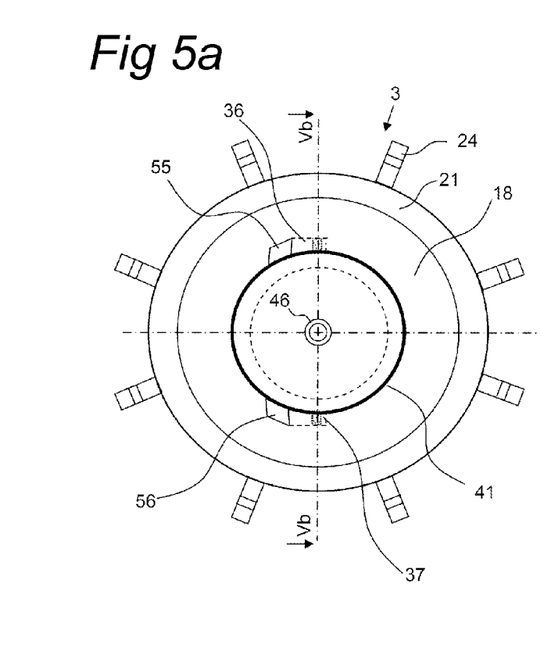
FIG. 5a shows front view of the second housing and second closure member of the split ball valve of FIG. 3.
Figure 5B:
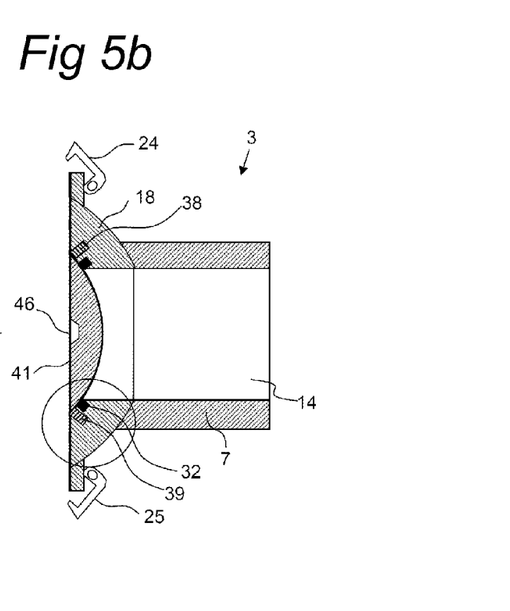
FIG. 5b shows a cross sectional view along the line Vb-Vb in FIG. 5a FIG. 5c is a detailed view of a locking mechanism between the second closure member and the housing of FIG. 5b.

FIG. 5a shows a front view of the second closure member 41 and the surrounding housing part 18 once the ball valve has been split. In this configuration the clamping means 24 are evenly distributed around the exterior of the housing part 18. The connector means in this case comprise for example pins or rims 38, 39 that are seated in grooves 36, 37 in the housing part 18 to sealingly lock the closure member 41 to the housing 18 of pipe segment 7. The pins or rims 38,39 enter the grooves (or recesses) 36, 37 via an opening 55, 56 and travel to their end position by rotating the valve gate 8 by a quarter turn around the pivot axis 9 from the open flow position shown in FIG. 1 to a closed position shown in FIG. 2. In this way, the pipe segment 7 is sealingly closed. The coupling means on the closure member 41 comprises the recess 46. It attaches the second gate part 41 rotationally to the gate part 40 and is shown here to be situated in the centre of the second closure member 41.

An alternative to the clamping means can be to have the two body parts 17, 18 as well as 10, 41 rotatable with respect to one another around the longitudinal centre line (26) using bearing means to unlock the two parts from each other (not shown).

Figure 5C:
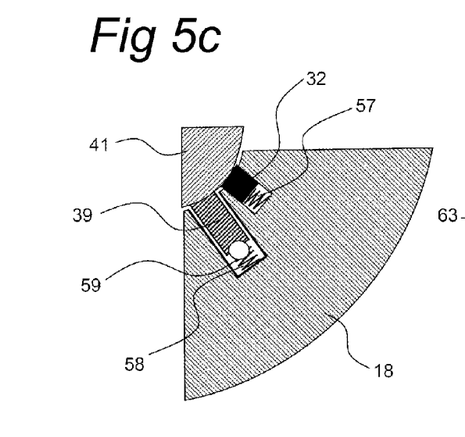

FIG. 5c shows an enlarged detail of the seal 32, which is spring biased by a spring 57 seated in a cavity in the housing part 18, against the closure member 41 for preventing fluid from leaking between gate part 41 and the housing part 18. As can be seen from FIG. 5c, at the end position of the grooves 36, 37 the there may be an additional locking mechanism 58, 59, such as a spring biased ball, engaging with the top of the protrusions 38 39 to lock the closure member 41 to the housing part 18 when it reaches it sealing end position.

Figure 6A:
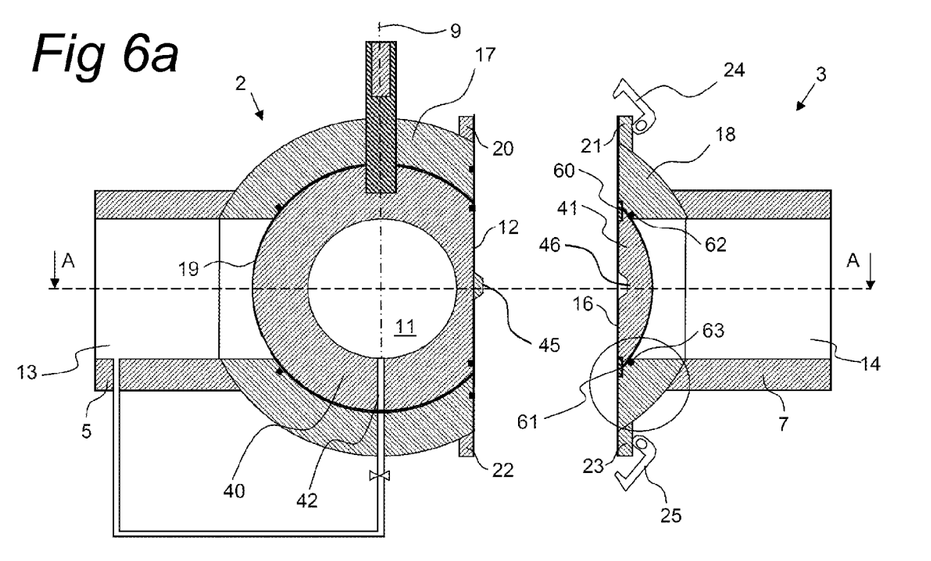
FIG. 6a shows a cross sectional view of another embodiment of a split ball valve according to the invention with the valve components in a separated state.
Figure 6B:
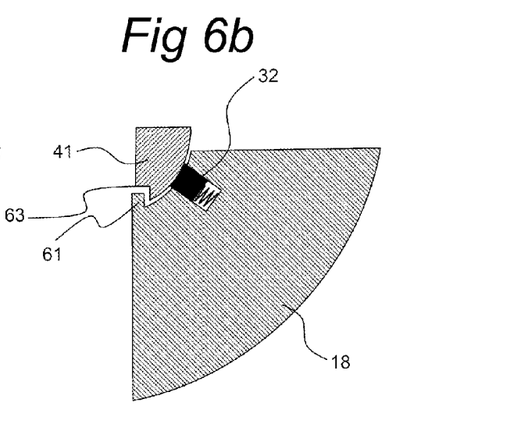
FIG. 6b is a detailed view of a locking mechanism between the second closure member and its corresponding housing part

FIG. 6a shows a cross-sectional view of another embodiment of the connector means, which comprise radial projections or a rims 60, 61 attached to the inner perimeter of the second housing part 18. In the enlarged detail of FIG. 6b it is clearly shown that the gate part 41 is provided with a shoulder 62, 63 which engages with the projections or rim 60, 61 on the housing when the closure member is in its closed end position. It is clear in this embodiment that the projections or rims 60, 61 are integral with the housing part 18. The position of the projections or rims 60, 61 in the interior of the housing part 18 and the shoulders 62, 63 are shaped in such a way that the projections 60, 61 receive and guide the shoulders 62, 63 on the gate part 41 while rotating the valve gate around pivot axis 9 upon closing the gate.

Figure 7A:
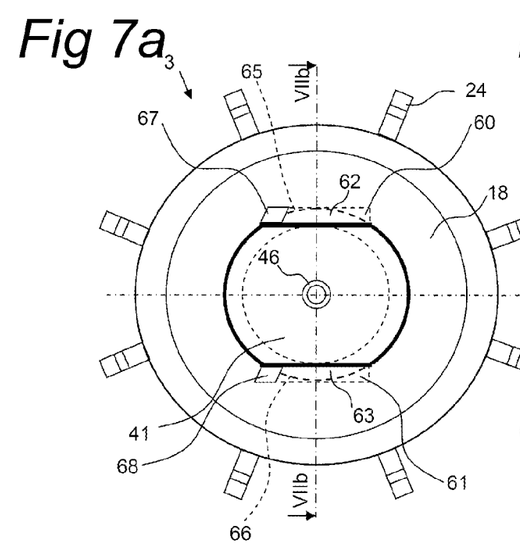
FIG. 7a shows a front view of the second housing and associated closure member of the split ball valve of FIG. 6a FIG. 7b shows a cross sectional view along the line VIIb-VIIb of FIG. 7a FIG. 8 shows a top view of a cylindrical valve according to the invention in a closed state (solid lines) and in an open state (dashed line)
Figure 7B:
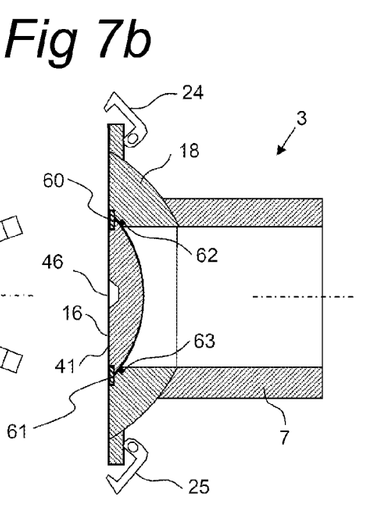

FIG. 7a shows a front view of the second gate part 41 which is sealingly locked in the housing part 18. The projections 60, 61 at the interior of the housing part 18 define grooves 65, 66 indicated with the dashed lines. The projections 60, 61 define openings 67, 68 between each projection and the interior wall of the housing part 18, through which openings the shoulders 62, 63 of the second gate part 41 can enter into the grooves 65, 66 upon rotation of the second gate part 41 around the pivot axis 9 into its sealingly closed position.

Figure 8:
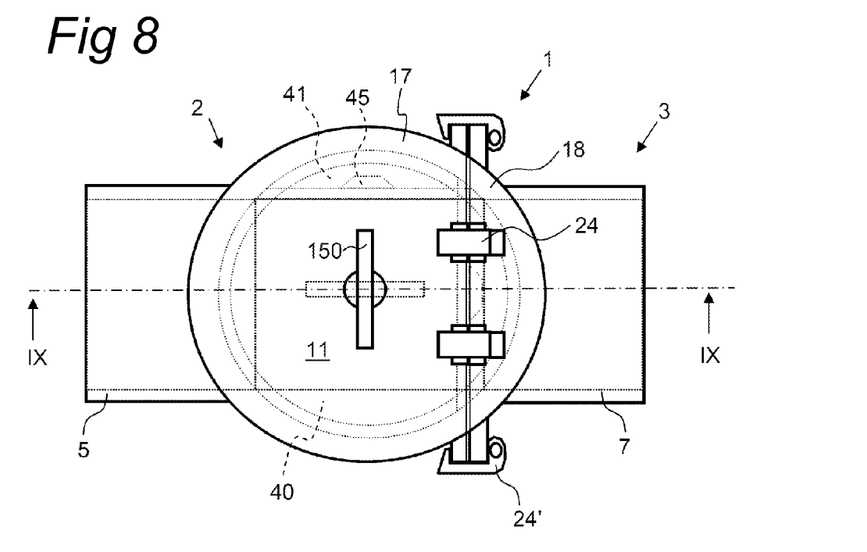

FIG. 8 shows a top view of a cylindrical valve assembly according to the invention in the closed state. The dashed lines indicate the open, or flow-through position.

Figure 9:
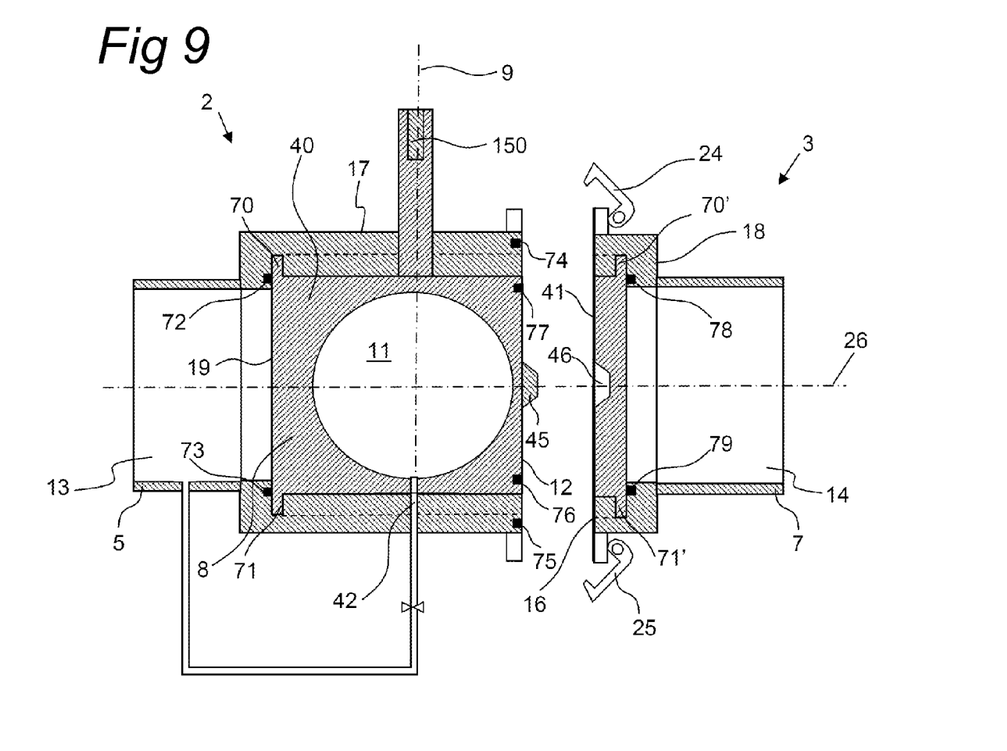
FIG. 9 shows a cross sectional view of the split cylindrical valve of FIG. 8 with the two housing parts in a separated state.

FIG. 9 is a cross sectional through the line IX-IX in FIG. 8 wherein the gate part 40 seal off pipe segment 5 and the gate part 41 closes off pipe segment 7. The valve gate 8 comprises a top flange 70 and a bottom flange 71 which are guided in annular recesses 70', 71' in the interior surface of the housing parts 17, 18 and which form the connector means sealingly locking the parts 40, 41 of the valve gate 8 to the respective housings 17, 18. Seals 73, 72 are situated between the housing part 17 and the gate part 40. Seals 74, 75 ensure that in the interconnected state of the housing parts 17, 18, no leakage of fluid can occur to outside the housing. Seals 76, 77 prevent fluid ingress between the valve gate parts 40, 41 after interconnection of the coupling surfaces 12, 16, and seals 78, 79 ensure liquid-tight sealing of the pipe segment 7 by the gate part 41 upon separation of the valve components 2, 3.

Figure 10A:
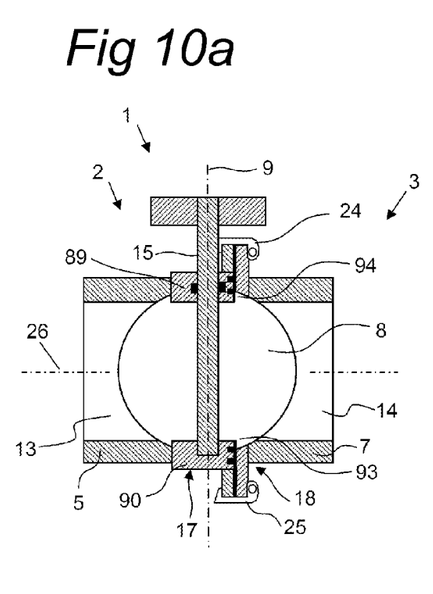
FIG. 10a and 10b shows a cross sectional view of a split gate valve according to the invention in an open and a closed state, respectively.
Figure 10B:
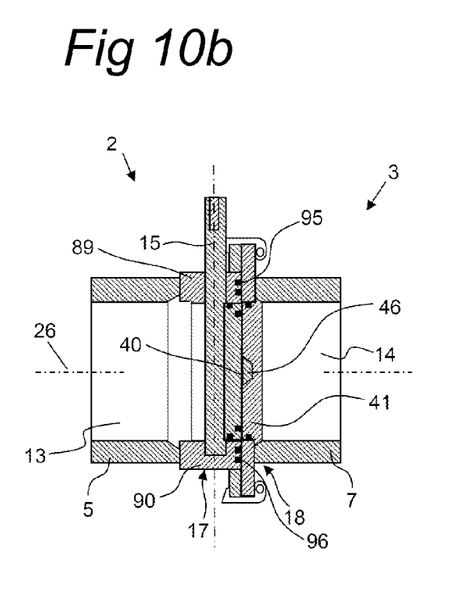
Figure 10C:
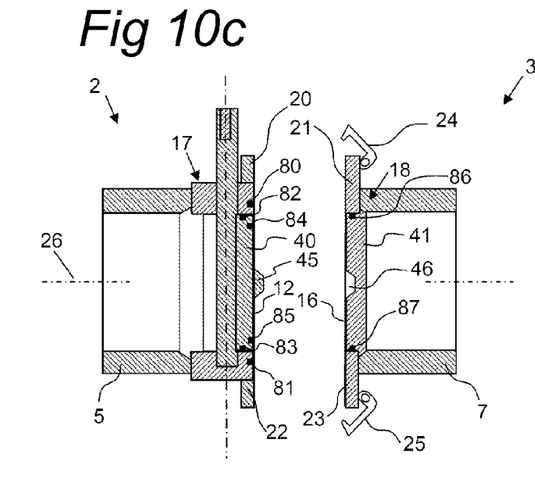
FIG. 10c shows a cross sectional view of the split gate valve of FIG. 10a and FIG. 10b with the two valve components in a separated state.

FIGS. 10a to 10c show another embodiment of a valve assembly of the present invention in which the valve is a butterfly valve and the valve gate 8 is disk-shaped. The closure members 40, 41 making up the valve gate are connected to the valve stem 15 which extends from a top seat 89 in the pipe segment 5 to a diametrically opposed lower seat 90. The housing part 17 at the end of pipe segment 5 comprises the seats 89, 90 in which the valve stem 15 is supported. The housing 18 at the end of the pipe segment 7 comprises the connector means 93, 94 which may be in the form of a groove receiving a shoulder 95, 96 on the disk shaped gate part 41. Seals 80, 81 mutually seal the housing parts 17, 18 when they are contiguous, seals 82, 83 seal the first gate part 40 against the inner wall of the housing part 17, seals 84, 85 seal the interface along connection surfaces 12, 16 of the first and second gate parts 40, 41 when they are contiguous and seals 86, 87 seal the second gate part 41 against the inner wall of the housing part 18 when in the closed position.

The invention is not limited to the embodiments shown in figures. Hence, a case where the ducts 5 and/or 7 would be inclined in relation with the axis 26 is also covered by the present invention.

The valve assembly components can be made, for example, of any metallic, plastic or elastomeric components.

The invention claimed is:

1. Valve assembly (1) comprising a first valve component (2) in fluid connection with a first duct (5), a second valve component (3) in fluid connection with a second duct (7), each valve component (2,3) having a housing (17,18) and first and second closure members (40,41) movably disposed within the respective first and second housing (17,18), the first closure member (40) having a pivot axis (9) extending generally transversely to the first duct (5), the first closure member (40) being pivotable around the pivot axis (9) between a closed position in which the closure member extends generally transversely to a longitudinal centre line (26) of the first duct (5) and an open position, wherein the first and second closure members (40,41) are each provided with coupling means (45,46) for releasably interconnecting the closure members (40,41), such that the second closure member (41) can be moved together with the first closure member (40) upon pivoting of the first closure member around the pivot axis, the second closure member comprising connector means (38,39; 62,63; 70',71'; 95,96) for engaging with complementary connector means (36,37; 60,61; 72,72'; 93,94) on the second housing (18) in a closed position of the second closure member, which connector means maintain the second closure member (41) in a non-pivotable sealed attachment with the second housing (18) when the valve components (2,3) are separated; and wherein the first and second closure members (40,41) define a generally cylindrical or spherical body (10) having a through bore (11), a coupling surface (12,16) extending at a distance from the bore (11) substantially parallel thereto, the coupling means (45,46) being situated on or near the coupling surfaces (12,16).

2. Valve assembly (1) according to claim 1, the first and second housing (17, 18) comprising external fixing devices (20, 21, 22, 23) for interconnecting the first and second housing (17, 18) in a fluid-tight manner.

3. Valve assembly (1) according to claim 1, the first closure member (40) further comprising an entry surface (33) and an exit surface (34) delimiting the through bore (11), the coupling surface (12, 16) on each closure member (40,41) extending substantially transversely to the entry and exit surfaces (33,34), the coupling means (45,46) being situated on or near the coupling surfaces (12,16), the coupling surfaces (12,16) of the closure members being contiguous, the body (10) being connected to a drive shaft (15) extending through the first housing (17) to an exterior drive position for pivoting the body (10) around the pivot axis (9).

4. Valve assembly (1) according to claim 1, a channel (42) extending transversely in the direction of the shaft, through bore (11), from the through bore (11) to the exterior of the body.

5. Valve assembly (1) according to claim 2, wherein the first and second housing (17, 18) define a spherical seating, the first and second closure members (40, 41) defining a ball valve, the connector means (38, 39; 62, 63) of the second closure member (41) comprising at least one notch or projection extending transversely to a spherical sealing surface, the connector means on the second housing (18) comprising a complementary projection or notch extending transversely to a spherical sealing surface.

6. Valve assembly (1) according to claim 5, wherein the connector means on the second closure member (41) comprise on each side of the longitudinal centre line (26) a projection (38, 39; 62, 63), the closure member on the second housing (18) comprising on each side of the longitudinal centre line (26) a groove, the projection being accommodated in the groove upon pivoting the second closure member around the pivot axis into the closed position or-upon pivoting the second closure member in its closed position around the longitudinal centre line (26).

7. Valve assembly (1) according to claim 5, wherein the coupling surfaces (12, 16) of the closure members are designed to permit rotation of the two valve components (2, 3) one compared to the other in order to close or open the valve.

8. Valve assembly (1) according to claim 6, wherein the groove is part of a circle with its mid point on the pivot axis (9) or is part of a circle with its mid point on the longitudinal centre line (26).

9. Valve assembly (1) according to claim 1, wherein the first and second housing (17,18) comprise a housing sealing member (29, 30; 74, 75; 81, 80) on a housing surface, the first and second closure members (40, 41) comprising a coupling sealing member (51, 52; 76, 77; 84, 85) on the coupling surface (12,16) and the second and first housing (17, 18) and/or the first and second closure members (40,41) comprising a closure sealing member (27, 28, 31, 32; 72, 73, 78, 79) for engaging with a corresponding surface of the first and second closure members (40, 41) and/or first and second housing (17, 18).

10. Valve assembly (1) according to claim 3, the combined first and second housing (17, 18) and the combined first and second closure members (40, 41) being substantially cylindrical, the connector means on the housing (17, 18) comprising on each side of the longitudinal centre line (26) an annular groove (70', 71') with a midpoint on the pivot axis (9), the first and second closure members (40, 41) comprising as complementary connector means a flange (70, 71) extending transversely to the longitudinal centre line (26) into the annular groove (70', 71').

11. Valve assembly according to claim 1, the closure members being substantially plate-shaped, the second housing (18) comprising a internal notch or groove (93, 94) extending in a direction transversely to the longitudinal centre line (26), the second closure member (41) comprising a complementary groove or flange (95, 96) extending transversely to the longitudinal centre line (26) for engaging in its closed position with the internal notch or groove (93, 94).

12. Valve assembly according to claim 2, the external fixing device (20, 21, 22, 23) comprising a number of radial projections (20-23) on each housing (17, 18), and a corresponding clamping device (24, 25) hingedly attached to the projection of one housing and clampingly engageable with an opposite radial projection upon hinging.

13. Valve assembly (1) according to claim 2, the first closure member (40) comprising a body (10) having a through bore (11), an entry surface (33) and an exit surface (34) delimiting the through bore (11), a coupling surface (12, 16) on each closure member (40,31) extending substantially transversely to the entry and exit surfaces (33,34), the coupling means (45,46) being situated on or near the coupling surfaces (12,16), the coupling surfaces (12,16) of the closure members being preferably contiguous, the body (10) being connected to a drive shaft (15) extending through the first housing (17) to an exterior drive position for pivoting the body (10) around the pivot axis (9).

14. Valve assembly (1) according to claim 3, wherein the first and second housing (17, 18) define a spherical seating, the first and second closure members (40, 41) defining a ball valve, the connector means (38, 39; 62, 63) of the second closure member (41) comprising at least one notch or projection extending transversely to a spherical sealing surface, the connector means on the second housing (18) comprising a complementary projection or notch extending transversely to a spherical sealing surface.

15. Valve assembly (1) according to claim 4, wherein the first and second housing (17, 18) define a spherical seating, the first and second closure members (40, 41) defining a ball valve, the connector means (38, 39; 62, 63) of the second closure member (41) comprising at least one notch or projection extending transversely to a spherical sealing surface, the connector means on the second housing (18) comprising a complementary projection or notch extending transversely to a spherical sealing surface.

16. Valve assembly (1) according to claim 2, wherein the first and second housing (17,18) comprise a housing sealing member (29, 30; 74, 75; 81, 80) on a housing surface, the first and second closure members (40, 41) comprising a coupling sealing member (51, 52; 76, 77; 84, 85) on the coupling surface (12,16) and the second and first housing (17, 18) and/or the first and second closure members (40,41) comprising a closure sealing member (27, 28, 31, 32; 72, 73, 78, 79) for engaging with a corresponding surface of the first and second closure members (40, 41) and/or first and second housing (17, 18).

17. Valve assembly (1) according to claim 3, wherein the first and second housing (17,18) comprise a housing sealing member (29, 30; 74, 75; 81, 80) on a housing surface, the first and second closure members (40, 41) comprising a coupling sealing member (51, 52; 76, 77; 84, 85) on the coupling surface (12,16) and the second and first housing (17, 18) and/or the first and second closure members (40,41) comprising a closure sealing member (27, 28, 31, 32; 72, 73, 78, 79) for engaging with a corresponding surface of the first and second closure members (40, 41) and/or first and second housing (17, 18).

18. Valve assembly (1) according to claim 4, wherein the first and second housing (17,18) comprise a housing sealing member (29, 30; 74, 75; 81, 80) on a housing surface, the first and second closure members (40, 41) comprising a coupling sealing member (51, 52; 76, 77; 84, 85) on the coupling surface (12,16) and the second and first housing (17, 18) and/or the first and second closure members (40,41) comprising a closure sealing member (27, 28, 31, 32; 72, 73, 78, 79) for engaging with a corresponding surface of the first and second closure members (40, 41) and/or first and second housing (17, 18).

19. Valve assembly (1) according to claim 5, wherein the first and second housing (17,18) comprise a housing sealing member (29, 30; 74, 75; 81, 80) on a housing surface, the first and second closure members (40, 41) comprising a coupling sealing member (51, 52; 76, 77; 84, 85) on the coupling surface (12,16) and the second and first housing (17, 18) and/or the first and second closure members (40,41) comprising a closure sealing member (27, 28, 31, 32; 72, 73, 78, 79) for engaging with a corresponding surface of the first and second closure members (40, 41) and/or first and second housing (17, 18).

20. Valve assembly (1) according to claim 6, wherein the first and second housing (17,18) comprise a housing sealing member (29, 30; 74, 75; 81, 80) on a housing surface, the first and second closure members (40, 41) comprising a coupling sealing member (51, 52; 76, 77; 84, 85) on the coupling surface (12,16) and the second and first housing (17, 18) and/or the first and second closure members (40,41) comprising a closure sealing member (27, 28, 31, 32; 72, 73, 78, 79) for engaging with a corresponding surface of the first and second closure members (40, 41) and/or first and second housing (17, 18).

21. Valve assembly (1) according to claim 1, wherein the coupling surface (12,16) is in non-contact with the bore (11).

* * * * *

UNITED STATES PATENT AND TRADEMARK OFFICE
CERTIFICATE OF CORRECTION

PATENT NO.       : 8,360,103 B2                                    Page 1 of 1
APPLICATION NO.  : 12/738727
DATED            : January 29, 2013
INVENTOR(S)      : Jack Pollack It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this

First Day of September, 2015

Michelle K. Lee
*Director of the United States Patent and Trademark Office*